(12) United States Patent
Abel

(10) Patent No.: US 9,617,014 B2
(45) Date of Patent: Apr. 11, 2017

(54) VEHICLE CABIN ARRANGEMENT COMPRISING A LIGHTING DEVICE

(71) Applicant: Airbus Operations GmbH, Hamburg (DE)

(72) Inventor: Christian Abel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 111 days.

(21) Appl. No.: 14/255,380

(22) Filed: Apr. 17, 2014

(65) Prior Publication Data

US 2014/0313751 A1    Oct. 23, 2014

(30) Foreign Application Priority Data

Apr. 18, 2013 (DE) .................. 10 2013 207 062

(51) Int. Cl.
*F21V 21/00* (2006.01)
*B64D 47/02* (2006.01)
(Continued)

(52) U.S. Cl.
CPC ............. *B64D 47/02* (2013.01); *B60Q 3/025* (2013.01); *B60Q 3/0259* (2013.01); *B64D 11/00* (2013.01); *B64D 2011/0038* (2013.01)

(58) Field of Classification Search
CPC B64D 47/02; B64D 11/00; B64D 2011/0038; B60Q 3/025; B60Q 3/0259
(Continued)

(56) References Cited

U.S. PATENT DOCUMENTS 4,625,267 A * 11/1986 Mikalonis .............. B60Q 3/025
                                                                 362/150
7,896,530 B2    3/2011 Budinger et al.
(Continued)

FOREIGN PATENT DOCUMENTS

DE    10 2004 020 119    12/2005
DE    10 2004 026 730    12/2005
(Continued)

OTHER PUBLICATIONS

German Search Report for Application No. 10 2013 207 062.4 dated Oct. 21, 2013.
(Continued)

*Primary Examiner* — Ali Alavi
(74) *Attorney, Agent, or Firm* — Jenkins, Wilson, Taylor & Hunt, P.A.

(57) ABSTRACT

A vehicle cabin arrangement for a vehicle body and a method for lighting a vehicle cabin and for displaying information using such a vehicle cabin arrangement are disclosed. A lighting device with a light-emitting surface directed towards the cabin interior space is provided on a ceiling section. The lighting device has separate lighting elements each having a dedicated light-emitting element surface, which lighting elements can assume different switch-on states and/or light emission states which differ in at least one property of the emitted light. A control device for controlling the lighting device is provided. The lighting elements are arranged so that, both in the direction parallel to the cabin longitudinal axis and in the direction perpendicular to the cabin longitudinal axis, element surfaces are arranged next to one another. The control device can control each lighting element individually with respect to its switch-on state and/or its light emission state.

11 Claims, 4 Drawing Sheets

(51) Int. Cl.
 *B60Q 3/02* (2006.01)
 *B64D 11/00* (2006.01)
(58) Field of Classification Search
 USPC .......................................... 362/471, 464, 549
 See application file for complete search history.

(56) References Cited

U.S. PATENT DOCUMENTS

| | | | | |
|---|---|---|---|---|
| 8,267,557 | B2* | 9/2012 | Vogel | B60Q 3/025 362/471 |
| 8,686,638 | B2 | 4/2014 | Marwede et al. | |
| 2004/0090787 | A1* | 5/2004 | Dowling | H05B 33/0842 362/464 |
| 2005/0237754 | A1 | 10/2005 | Klettke | |
| 2007/0236926 | A1* | 10/2007 | Guard | B60Q 3/0253 362/228 |
| 2009/0112407 | A1 | 4/2009 | Kneller et al. | |
| 2010/0014009 | A1* | 1/2010 | Stavaeus | B64D 11/0015 348/837 |
| 2012/0051064 | A1 | 3/2012 | Schevardo et al. | |
| 2014/0253335 | A1* | 9/2014 | Curtis | G08B 5/00 340/573.1 |

FOREIGN PATENT DOCUMENTS

| | | |
|---|---|---|
| DE | 20 2005 014 791 U1 | 12/2005 |
| DE | 10 2006 007 285 A1 | 8/2007 |
| DE | 20 2007 006 707 | 8/2007 |
| DE | 10 2007 004 829 | 8/2008 |
| DE | 10 2007 008 164 | 8/2008 |
| DE | 10 2007 011 155 | 9/2008 |
| DE | 10 2009 029 874 | 12/2010 |
| DE | 10 2010 036 101 | 3/2012 |
| EP | 2 343 215 A1 | 7/2011 |
| WO | WO 2010/097253 | 9/2010 |
| WO | WO 2011/082998 | 7/2011 |

OTHER PUBLICATIONS

Partial European Search Report for European Patent Application No. 14165174.5 dated Jul. 3, 2015.
Extended European Search Report for Application No. 14165174.5 dated Nov. 10, 2015.

* cited by examiner

VEHICLE CABIN ARRANGEMENT COMPRISING A LIGHTING DEVICE

CROSS-REFERENCE TO RELATED APPLICATION

This application claims priority to German Patent Application No. 102013207062.4 filed Apr. 18, 2013, the entire disclosure of which is herein incorporated by reference.

BACKGROUND

The subject matter disclosed herein relates to a vehicle cabin arrangement for a vehicle body or for accommodation in a vehicle body, in particular an aircraft cabin arrangement for an aircraft fuselage or for accommodation in an aircraft fuselage. The vehicle cabin arrangement comprises a cabin wall which extends in tubular manner along a cabin longitudinal axis and in the process surrounds an interior space, wherein the cabin wall has, when viewed transversely with respect to the cabin longitudinal axis, two opposite side sections, a ceiling section arranged between the two side sections and a floor section opposite the ceiling section. In addition, the vehicle cabin arrangement comprises a lighting device, which is provided on the ceiling section, extends preferably parallel to the cabin longitudinal axis and has a light-emitting surface directed towards the interior space, wherein the lighting device has a plurality of separate lighting elements, and wherein each lighting element has a dedicated light-emitting element surface directed towards the interior space, which element surface forms part of the light-emitting surface of the lighting device and is referred to as element surface within the scope of this application for reasons of simplicity. Finally, the vehicle cabin arrangement also comprises a control device for controlling the lighting device.

Further aspects of the subject matter disclosed herein relate to a system comprising a vehicle cabin arrangement according to the subject matter disclosed herein and an electronic boarding pass, to a vehicle and in particular to an aircraft comprising a vehicle cabin arrangement according to the subject matter disclosed herein, and to a method for lighting a vehicle cabin and for displaying information.

Preferably, a plurality of seats for passengers are fitted or arranged on the floor section of the cabin wall and are preferably arranged in a plurality of rows of seats. Such rows of seats preferably extend transversely and preferably perpendicular to the cabin longitudinal axis and are spaced apart from one another in the direction of the cabin longitudinal axis. Each of said rows of seats has a plurality of seats for passengers in its direction of extent. The lighting device is preferably arranged centrally on the ceiling section, when viewed transversely with respect to the cabin longitudinal axis, with the result that sections of the ceiling section which are equal in size extend to the left and right of the lighting device.

Such vehicle cabin arrangements are known from the prior art and are in widespread use, for example, as aircraft cabin arrangements, primarily in commercial aircraft and passenger cabins of said commercial aircraft. In this case, the lighting device provided on the ceiling section of the cabin wall is used exclusively for lighting the interior space. A plurality of lighting elements with dedicated light-emitting element surfaces is provided in order to be able to be installed and maintained individually and independently of the others and in this way to simplify installation and maintenance.

In addition, in the case of the vehicle cabin arrangements and in particular aircraft cabin arrangements known from the prior art, various display devices for reproducing specific information are provided, such as, for example, the seat number, the class assignment (first class, business class or economy class), the preset escape route in the event of an emergency or the notification of a call made to a flight attendant from a specific passenger seat. Such display devices are generally arranged in the region of the seats of the passengers, on the ceiling section next to the lighting device or on the floor section.

However, it is disadvantageous if a dedicated display device of this kind needs to be provided for each item of information or groups of items of information which are intended to be reproduced. This is because these display devices require space, make a disadvantageous contribution to the weight of the vehicle, need to be installed, maintained and controlled specifically and, at least above a certain number, are confusing for a passenger.

SUMMARY

Therefore, an object of the subject matter disclosed herein is to provide a vehicle cabin arrangement which avoids the above disadvantages and in particular has a simpler design, takes up less space and weight, provides improved possibilities for displaying information and overall is configured so as to be less confusing and more efficient. This object is achieved by the lighting elements being arranged in such a way that, both in the direction parallel to the cabin longitudinal axis and in the direction perpendicular to the cabin longitudinal axis, a plurality of element surfaces are arranged next to one another. In other words, the lighting elements or their element surfaces are arranged distributed over the ceiling section in an arrangement, preferably an arrangement which is two-dimensional but possibly also three-dimensional. The element surfaces of all of the lighting elements together form, possibly with non-light-emitting areas located between them, the light-emitting surface of the lighting device. The lighting elements are configured in such a way that they can each assume different switch-on states and/or different light emission states which differ from one another in terms of at least one property of the light emitted by the element surface of the respective lighting element. A switch-on state is generally understood to mean the on or off state and, within the scope of the present application, a light emission state corresponding to the above definition is understood to mean an operating state of a lighting element in which the element surface emits light of predetermined properties, such as, for example, light of a predetermined wavelength or colour and/or a predetermined intensity.

BRIEF DESCRIPTION OF THE DRAWINGS

An exemplary embodiment of the subject matter disclosed herein will be explained in more detail below with reference to a drawing, in which.

DETAILED DESCRIPTION

Figure 1:
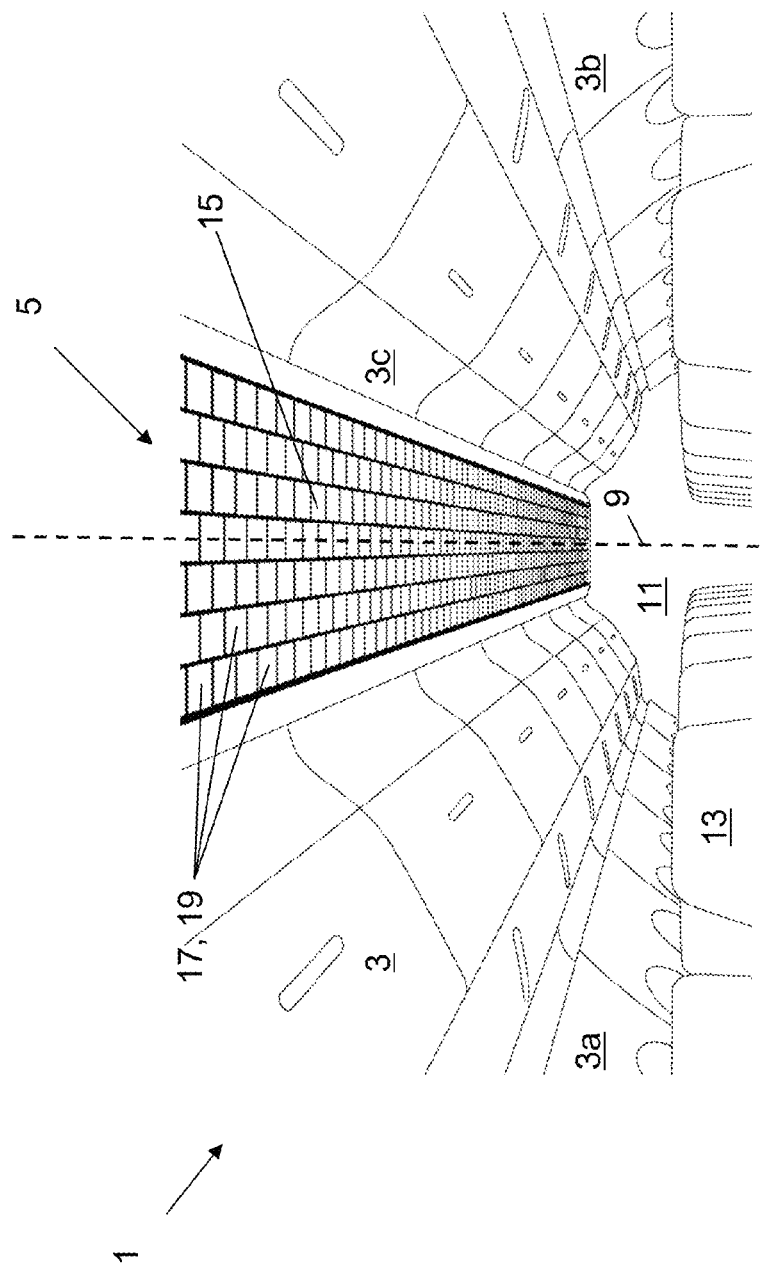
FIG. 1 shows a perspective illustration of an aircraft cabin arrangement according to the subject matter disclosed herein, wherein all of the element surfaces emit light uniformly.

In accordance with the subject matter disclosed herein, the lighting elements are arranged in such a way that, both in the direction parallel to the cabin longitudinal axis and in the direction perpendicular to the cabin longitudinal axis, a plurality of element surfaces are arranged next to one another. In other words, the lighting elements or their element surfaces are arranged distributed over the ceiling section in an arrangement, preferably an arrangement which is two-dimensional but possibly also three-dimensional. The element surfaces of all of the lighting elements together form, possibly with non-light-emitting areas located between them, the light-emitting surface of the lighting device. The lighting elements are configured in such a way that they can each assume different switch-on states and/or different light emission states which differ from one another in terms of at least one property of the light emitted by the element surface of the respective lighting element. A switch-on state is generally understood to mean the on or off state and, within the scope of the present application, a light emission state corresponding to the above definition is understood to mean an operating state of a lighting element in which the element surface emits light of predetermined properties, such as, for example, light of a predetermined wavelength or colour and/or a predetermined intensity.

The control device is in this case adapted to control each lighting element individually with respect to the switch-on state and/or the light emission of the associated element surface, i.e. to control said lighting element individually in such a way that, during operation, it can assume each of its different switch-on states and/or different light emission states selectively independently of the other lighting elements.

In addition, the control device has a storage device, which is adapted to store a plurality of control parameter sets or in which a plurality of control parameter sets are stored. Each of these sets corresponds to a different light emission pattern of the plurality of lighting elements, which light emission pattern is characterized by different switch-on states and/or light emission states of different ones of the lighting elements, or corresponds to another variant of the light emission of the element surfaces. In other words, a light emission pattern is determined by a plurality of or all of the lighting elements or their element surfaces and the light emitted thereby, and not by a pattern within an individual element surface. Thus, a light emission pattern can be defined, for example, by virtue of the fact that only specific lighting elements are switched on and emit light, while the remaining lighting elements are switched off and are not emitting any light. A further example of a light emission pattern consists in that specific lighting elements emit light of a first colour, while the remaining lighting elements emit light of one or more other colours. Further examples include combinations of these two examples. The control device is adapted to control the lighting device selectively for each of the control parameter sets in such a way that the lighting elements are operated in accordance with the corresponding light emission pattern. In particular, a selection from among the control parameter sets can be performed by a user or automatically on the basis of a detected signal.

In this context, it should be noted that, firstly, provision can be made for a control parameter set to define a light emission pattern in such a way that the switch-on state and the light emission state of each of the lighting elements is preset, i.e. the same lighting elements are always controlled in the same way on the basis of such a control parameter set. Secondly, however, provision can also be made for a control parameter set to define a light emission pattern in such a way that the switch-on state and the light emission state of a group of lighting elements which is not absolutely fixed in terms of its position within the totality of the lighting elements are preset, and that, when such a control parameter set is used, the control device additionally indicates the position of the group within the totality of the lighting elements. While in the former case the light emission pattern is defined absolutely by the control parameter set, in the latter case it is defined relatively. In other words, it is defined by a pattern which can be represented depending on the situation at a desired position within the totality of the lighting elements. A light emission pattern can then be regarded as a subpattern which is variable or "movable" in terms of position.

By individually controlling each individual lighting element, it is possible for not all of the lighting elements or all of the lighting elements of respective spatially associated groups to be in the same state, but for lighting elements which are arranged next to one another both in the direction of the cabin longitudinal axis and transversely to the cabin longitudinal axis to be operated with different switch-on states and/or light emission states. In particular, the lighting device can be controlled, for example, in such a way that one or more of the lighting elements are operated with a first switch-on state and/or first light emission state, while all adjacent lighting elements are operated with a second switch-on state and/or second light emission state, wherein the first switch-on state is different from the second switch-on state and the first light emission state is different from the second light emission state. As a result, it is advantageously possible to display different information with the aid of the lighting device, which information is encoded in different light emission patterns or corresponds to different variants of the light emission, with the result that, at least sometimes, it is possible to dispense with separate corresponding display devices. Since the light emission patterns can be supplemented or adapted flexibly by storage or modification of corresponding control parameter sets, there is furthermore advantageously increased flexibility in comparison with fixedly installed separate display devices.

The lighting device can extend completely or partially over the ceiling section in the direction of the cabin longitudinal axis and/or completely or partially over the ceiling section transversely to the cabin longitudinal axis. Independently of this, it is preferred if the lighting elements or the element surfaces are arranged, in a two-dimensional arrangement or possibly also in a three-dimensional arrangement, in such a way that the distance between adjacent lighting elements or element surfaces is smaller in a specific dimension than the diameter of the lighting elements or element surfaces in this dimension.

The lighting elements or their element surfaces are preferably arranged in a plurality of rows and/or a plurality of columns, wherein the rows preferably extend parallel to the cabin longitudinal axis and the columns preferably extend transversely, such as, for example, perpendicular or at an angle, to the cabin longitudinal axis. This means that preferably a plurality of parallel rows, a plurality of parallel columns or a plurality of parallel rows and columns are provided, wherein the individual element surfaces in adjacent rows and/or columns can also be arranged offset with respect to one another, with the result that, in the case of rows offset with respect to one another, for example, zigzag-shaped columns result or, in the case of columns arranged offset with respect to one another, for example, zigzag-shaped rows are produced. The more rows and columns are provided or quite generally the more element surfaces are provided in the distribution, the better different information can be displayed via the lighting device. If a plurality of columns is provided which extend transversely and preferably perpendicular to the cabin longitudinal axis, preferably at least as many columns are provided as to ensure that a dedicated column or a dedicated group of adjacent columns can be or is assigned to each row of seats. In this case, it is further preferred if each column contains at least as many lighting elements as is required for a separate lighting element or a separate group of lighting elements to be assigned to each group of seats, for example on both sides of an aisle, and more preferably to each individual seat in each row of seats. It is thus possible to display an indication of a specific row of seats, a specific group of seats or a specific seat with the aid of the lighting device.

Information which can be displayed via the individual actuation of the individual lighting elements of the lighting device can be, for example, the seat number or designation and the preset route for a passenger to the allocated seat on boarding, the class assignment of specific rows of seats (first class, business class or economy class), the preset escape routes in the event of an emergency or the indication of a call made to a flight attendant from a specific passenger seat. In addition, given the possibility of identification of a passenger by the control device, a passenger can be guided back to his seat by the lighting device by virtue of, for example, the route to his seat being "traced" on the ceiling section. For this purpose, the control device is preferably configured and adapted to implement such an identification automatically on the basis of electronic identification devices which the passengers carry with them, for example in the form of an electronic boarding pass. The control device then has a suitable reader or is connected to a suitable reader. The electronic identification devices can be constructed, for example, using RFID technology, i.e. they are RFID devices or tags and the reader is an RFID reader. However, it is also possible to provide manual or semiautomatic identification which requires an input from a passenger.

Such information can be represented, for example, by virtue of the fact that the lighting elements are controlled in such a way that a group of, in particular adjacent, element surfaces emits light of the same intensity and/or colour, with the result that a certain pattern, such as, for example, an arrow, a path or even entire letters or numbers is/are produced, which in turn represents the information to be reproduced. The remaining lighting elements can then either be in their off state or emit light of other properties. Such a pattern can also be represented in multicoloured fashion and/or with graduated intensities if various element surfaces of the corresponding group emit light of different colours or different intensities. An individual light emission of an individual element surface or a group of adjacent element surfaces which deviates from the light emission of the remaining element surfaces can also be used to reproduce information, for example in the case of the indication of a specific seat or a passenger call from a specific seat. Flashing, i.e. an interrupted light emission of an individual element surface or a group of element surfaces, can likewise be used for reproducing information.

For controlling the lighting elements and generating desired patterns of light emission, different sets of control parameters can be used which are stored either permanently in the storage device and are called up by a selection or input signal provided or generated within the control device or a selection or input signal triggered outside the control device or which are calculated by the control device by an algorithm in response to such an input signal and then stored, possibly even only temporarily, in the storage device.

At the same time, the lighting elements, in any case, can also be controlled in such a way that all of the element surfaces emit light uniformly with a common colour and intensity, with the result that the lighting device can be used exclusively for lighting the interior space. It is likewise conceivable for some of the element surfaces, for example the two outer columns or a central column to be capable of emitting uniform light and thus of being used (exclusively) for interior lighting, while the remaining element surfaces are controlled for reproducing information. It can be desirable if the lighting device comprises a diffuser device, which is arranged and configured in such a way that any interspaces between the individual lighting elements are no longer visible in the visual appearance, i.e. the light-emitting surface of the lighting device appears as a uniform and uninterrupted light-emitting surface in the case of uniform emission of light of identical colour and intensity by all of the element surfaces.

All in all, in this way not only the interior space can be illuminated by the lighting device, but it is also possible for various information to be displayed in an advantageous manner thereby, with the result that the use of separate display devices is superfluous. As a result, the design of the aircraft cabin arrangement is substantially simplified and less confusing. In addition, virtually any desired amount of further information can be represented in a very flexible manner, for which purpose it is merely necessary to introduce further control parameter sets.

Each lighting element preferably emits light uniformly in the same colour and the same intensity over the entire element surface in each of its light emission states. However, colour and/or intensity of the emitted light can vary depending on the actuation.

In a preferred embodiment, each lighting element can be controlled individually with respect to the intensity of the emitted light and/or with respect to the colour or wavelength of the emitted light in order to assume corresponding different light emission states. The intensity and colour of the emitted light can preferably be varied continuously. In addition, the emitted light can preferably be interrupted at variable intervals, with the result that flashing is brought about which can be used as a reproduction possibility for information in addition to the colour and intensity of the emitted light. Such a flashing state within the scope of this application is also understood as being part of a light emission state.

In a preferred embodiment, the control device is adapted in such a way that, during operation, once a control parameter set which corresponds to a light emission pattern which is constant over time has been stored in the storage device and once this control parameter set has been selected, it controls the lighting device in such a way that the lighting elements are operated with the same light emission pattern which is constant over time, and/or, once a control parameter set which corresponds to a light emission pattern which is variable over time has been stored in the storage device, and once this control parameter set has been selected, it controls the lighting device in such a way that the lighting elements are operated with the light emission pattern which is variable over time. In other words, light emission patterns with which the lighting device can be operated through controlling of the control device on the basis of control parameter sets stored in the storage device can be only static light emission patterns, only dynamic light emission patterns or both static and dynamic light emission patterns. With the aid of dynamic light emission patterns, or light emission patterns which are variable over time, which can in particular consist of a temporal sequence of static light emission patterns which is defined by the respective control parameter set, the information representation can be further improved and made more flexible. In addition, entertainment elements such as more or less complex computer games can also be implemented, in which, for example, different passengers can play against one another.

Irrespective of whether a light emission pattern is static or dynamic, it can be defined by the respective control parameter set also in such a way that it can be displayed at various points of the lighting device, depending on the situation and as already indicated above. Thus, a specific control parameter set could define a light emission pattern for a call to a flight attendant made by a passenger, and this light emission pattern could then be represented in the vicinity of the respectively calling passenger.

It is also possible for the control device to be adapted so as to control not only lighting elements of the lighting device on the basis of the control parameter sets, but also other elements which are arranged separately from the lighting device at a different point in the vehicle cabin. Thus, a control parameter set could define, for example, that the control device is intended firstly to actuate the lighting device in order to operate said lighting device with a specific light emission pattern, and secondly that it is intended to control a display screen assigned to a passenger seat or a light-emitting element assigned to a passenger seat in order to display specific information or assume a specific operating state.

In a further preferred embodiment, one or more of the lighting elements and preferably all of the lighting elements comprise an OLED element, which provides the element surface. In accordance with the subject matter disclosed herein, OLED elements are understood to mean organic light-emitting diode elements, which are in this case particularly well suited as lighting elements since they take up little space in terms of depth and can be arranged particularly favourably in the form of tiles, even with a certain curvature of the surface, and are easily controllable in terms of the intensity and colour of the light emission.

In yet a further preferred embodiment, in which the lighting elements and the element surfaces are arranged in rows and columns, in the direction of the cabin longitudinal axis, i.e. per row, at least 10, preferably at least 50, further preferably at least 200 element surfaces are arranged next to one another and, in the direction transverse or perpendicular to the cabin longitudinal axis, i.e. per column, at least 3, preferably at least 5, further preferably at least 7 element surfaces are arranged next to one another. However, it is particularly preferred if at least one element surface is provided per row of seats and is assigned to said row of seats. As has already been specified above, it is in this case further preferred if a separate lighting element or a separate group of lighting elements is assigned to each group of seats, for example on both sides of an aisle, and more preferably to each individual seat in each row of seats.

In a preferred embodiment, a large number of rows of seats are fitted on the floor section and each comprise a plurality of seats and extend in each case transversely to the cabin longitudinal axis and are spaced apart from one another along the cabin longitudinal axis and, when viewed in the direction of the cabin longitudinal axis, one or preferably a plurality of lighting elements are arranged on a level with each row of seats. In this way, the at least one element can be controlled so as to indicate to the corresponding assigned row of seats or reproduce information relating to this row of seats. It is particularly preferred in this context if a separate lighting element or a separate group of lighting elements is assigned in this way to each group of seats in each row of seats, for example on both sides of an aisle, and more preferably to each individual seat in each row of seats. Then, the elements can be controlled in such a way that they indicate a specific group of seats or a specific seat. The more element surfaces are provided per row and per column, the better the information can be reproduced by the lighting device.

In a preferred embodiment, the element surfaces of a plurality of, preferably all of, the lighting elements extend in a common plane. Thus, a smooth and uniform surface can be formed in the region of the lighting device which can be treated and cleaned in a particularly space-efficient and easy manner and whose individual element surfaces differ substantially from one another in terms of different intensity or colour of the light emission.

In a preferred embodiment, a shield element is provided in front of the light-emitting surface of the lighting device, which shield element has light-transmissive openings, which are arranged in front of the light-emitting element surfaces of the lighting elements. With such a shield element, a desired shape which is useful for reproducing information can be imparted to those parts of the element surfaces which are visible from the interior space and therefore a desired shape can be imparted also to the entire light-emitting surface of the lighting device, as a result of which individual lighting elements or element surfaces thereof can be further delimited from one another. The shield element can also be provided in the form of individual subelements for each individual lighting element. The subelements can be formed, for example, in each case by a suitable mask or masking, which is arranged on or applied to the actual light-emitting surface of the relevant lighting element.

In a preferred embodiment, a sensor device is provided which is connected to the control device so as to enable signal communication and which is adapted to receive a boarding pass signal or identification signal from an electronic boarding pass and to transmit a sensor signal corresponding to the boarding pass signal or identification signal to the control device. In turn, the control device is adapted to control the lighting elements corresponding to the sensor signal. In this case, the boarding pass signal or identification signal and the sensor signal comprise identification information which identifies the holder of the boarding pass and/or his seat, and preferably the number or designation of the seat of the holder of the boarding pass, and the lighting elements are controlled in such a way that the element surface(s) which is/are in the region of this seat or is/are assigned to this seat reproduce(s) information indicating this seat, i.e. emit(s) corresponding light, for example in the form of an arrow or in the form of a path which extends from the entry of the cabin arrangement up to the corresponding allocated seat and can therefore lead the passenger to his seat. The corresponding light emission patterns can in particular also be dynamic by virtue of them indicating the route to the seat in the form of a moving pattern. In addition, in the manner described above, further devices apart from the lighting device can also be controlled on the basis of the boarding pass signal, such as, for example, a seat number display which illuminates correspondingly.

A further aspect of the subject matter disclosed herein relates to a system comprising a vehicle cabin arrangement and in particular an aircraft cabin arrangement according to one or more of the above-described embodiments and an electronic boarding pass, which is designed to transmit a boarding pass signal or identification signal representing the seat position of a passenger to the sensor device. Such an electronic boarding pass can be a device with any desired configuration which is adapted to induce a signal containing the seat position of the boarding pass holder, which signal can be identified by the sensor device, and can have an RFID device, for example.

A further aspect of the subject matter disclosed herein relates to a vehicle and in particular to an aircraft comprising a vehicle or aircraft cabin arrangement in accordance with one or more of the above-described embodiments. Embodiments dealt with above in relation to the cabin arrangement apply here correspondingly.

Yet a further aspect of the subject matter disclosed herein relates to a method for lighting a vehicle cabin and for displaying information using a vehicle cabin arrangement, a system or a vehicle of the above configurations. The method comprises, possibly after the provision of a vehicle cabin arrangement, a system or a vehicle according to one or more of the above-described embodiments, the following steps:
  inputting data corresponding to information to be displayed to the control device,
  storing a control parameter set on the basis of the input data in the storage device, wherein the control parameter set represents a light emission pattern which corresponds to the information to be displayed, and
  controlling the lighting device by the control device on the basis of the control parameter set in such a way that each lighting element is controlled individually with respect to its switch-on state and/or its light emission state, and the lighting device is operated corresponding to the light emission pattern.

Examples of the predetermined information displayed in this way correspond to the examples cited in connection with the vehicle cabin arrangement. The explanations and advantages set forth in connection with the vehicle cabin arrangement also apply to the method. In addition, the method can have any configuration which has been specified above in connection with the configuration and operation of the vehicle cabin arrangement and its control device and has been explained in detail.

In a preferred embodiment, various sets of control parameters which correspond to information which is intended to be displayed are input and/or stored in the storage device. After selection by a user, then one of these sets is used by the control device for correspondingly controlling the lighting device. Each control parameter set again corresponds to a specific light emission pattern as a result of the totality of the element surfaces and therefore to specific information which is intended to be displayed. If appropriate, it is also possible for a plurality of control parameter sets to be combined, as a result of which the displayed information is also combined. The selection of a control parameter set can be performed by a user at an input region, but can also be performed by the control device in accordance with an algorithm in response to an input signal triggered by a user.

In a further embodiment, the actuation of the lighting device is performed in response to an input signal triggered outside the control device. Such an input signal can be triggered, for example, by an electronic boarding pass, which, by the input signal, communicates information relating to the position of the seat of a passenger or other identification information to the control device and from there to the lighting device so as to be reproduced, or can be triggered by a passenger requesting a flight attendant or making the crew aware of his requirements.

In this case, it is particularly preferred if the input signal is triggered by activation of one of a plurality of input buttons or keys provided in each case in the region of the rows of seats or individual seats and the light emission pattern triggered by the input signal comprises a light emission of the lighting element closest to the row of seats or seat which is assigned to the triggering input button or of a group of lighting elements which is close and is assigned to the row of seats or the seat, which light emission deviates from the light emission of the remaining lighting elements or at least the surrounding lighting elements.

The region of the rows of seats should in this case be understood to mean that it includes that which the passenger can reach when he is sitting in his seat, in particular the actual seat, the backrest of the seat in front and that region of the ceiling section of the cabin wall which is mounted within range and built-in elements fitted on said ceiling section. The button is also understood to mean a button provided on a touch screen. The lighting element closest to the row of seats assigned to the triggering button should be understood to mean that this does not necessarily only have to be a single lighting element, but can also include a coherent group of lighting elements.

In this case, the input signal triggers the selection of a set of control parameters which results in the above-described variant of the light emission or the corresponding light emission pattern in the control device, wherein the corresponding set of control parameters is selected either from a plurality of sets stored in the storage device or is calculated by an algorithm depending on the input signal via the control device.

Figure 4:
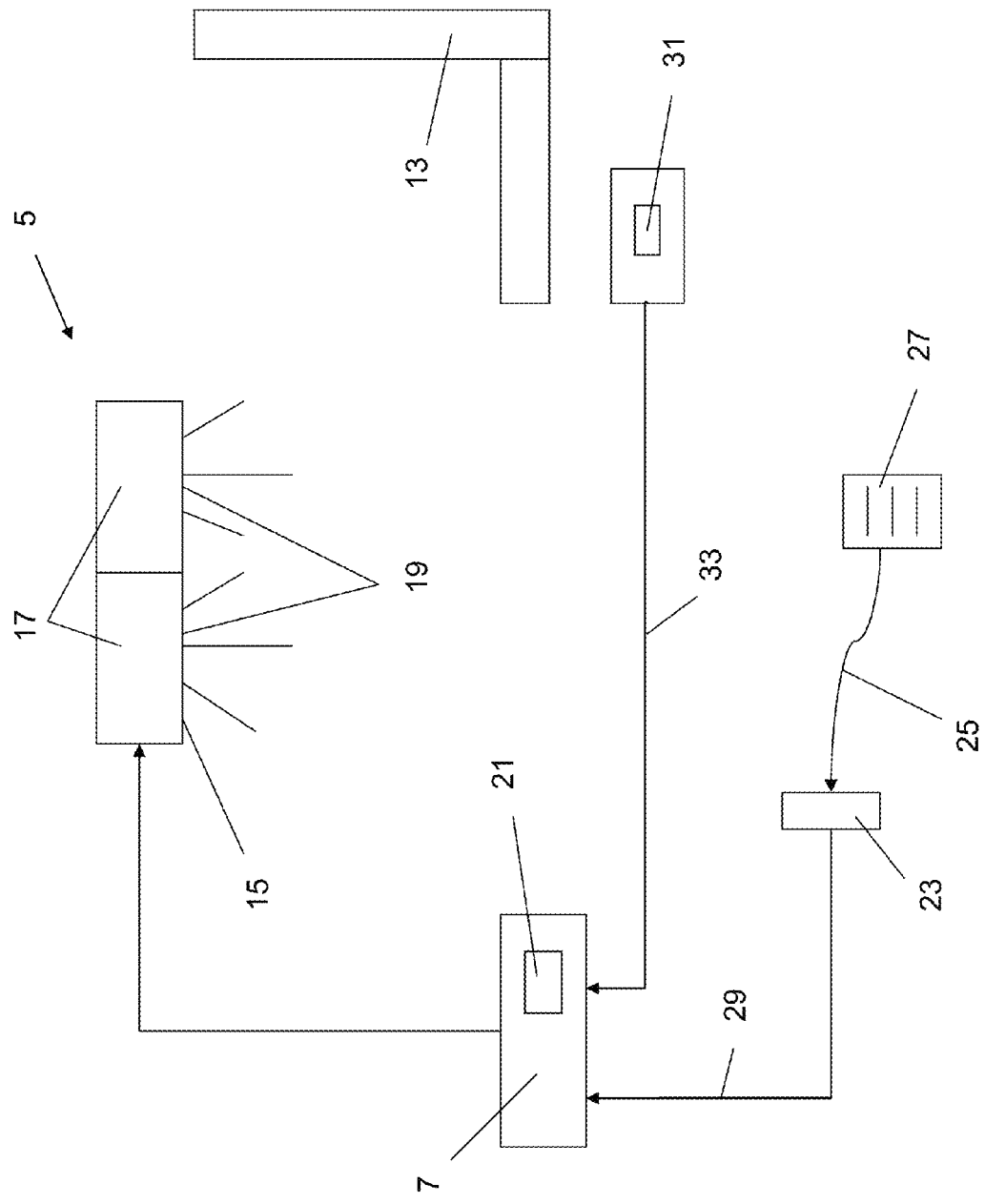
FIG. 4 shows a schematic illustration of some component parts of the aircraft cabin arrangement shown in FIG. 1 including an electronic boarding pass.

FIG. 1 illustrates an exemplary embodiment of an aircraft cabin arrangement 1 comprising a cabin wall 3, a lighting device 5 and a control device 7 (see FIG. 4).

The cabin wall 3 extends in tubular fashion along a cabin longitudinal axis 9 and in the process surrounds an interior space 11. When viewed transversely to the cabin longitudinal axis 9, the cabin wall 3 comprises two opposite side sections 3a, 3b, a ceiling section 3c arranged between the two side sections and a floor section (not shown) opposite the ceiling section 3c.

A plurality of rows of seats 13 are fitted on the floor section and run perpendicular to the cabin longitudinal axis 9 (see FIG. 1) and are arranged spaced apart from one another parallel to the cabin longitudinal axis 9.

The lighting device 5 is provided on the ceiling section 3c and extends parallel to the cabin longitudinal axis 9. In addition, the lighting device 5 has a light-emitting surface 15 directed towards the interior space 11. The lighting device 5 also has a plurality of separate lighting elements 17, wherein each lighting element 17 has a dedicated light-emitting element surface 19 directed towards the interior space 11. The lighting elements 17 are arranged in such a way that, both in the direction parallel to the cabin longitudinal axis 9 and in the direction perpendicular to the cabin longitudinal axis 9, a plurality of element surfaces 19 are arranged next to one another.

The control device 7 is intended for controlling the lighting device 5. It is adapted to control each lighting element 17 individually with respect to the light emission of the associated element surface 19. In addition, the control device 7 has a storage device 21, which is adapted to store a plurality of sets of control parameters (see FIG. 4). Each of these sets of control parameters is intended for inducing a variant of the light emission or a light emission pattern of the element surfaces 19. In this case, each of these variants of the light emission corresponds to the representation or display of predetermined information assigned to the respective light emission pattern.

The lighting elements 17 are in the form of OLED elements, which can be controlled so as to represent information or so as to display a specific light emission pattern with respect to the intensity and colour of the emitted light and with respect to their switch-on state. The element surfaces 19 extend in a common plane in the centre of the ceiling section 3c. In the present exemplary embodiment, seven rows of element surfaces 19 are provided parallel to the cabin longitudinal axis 9 and a plurality of columns of element surfaces 19 are provided transversely to the cabin longitudinal axis 9, wherein the individual rows are offset with respect to one another such that the columns have a zigzag profile.

Figure 2:
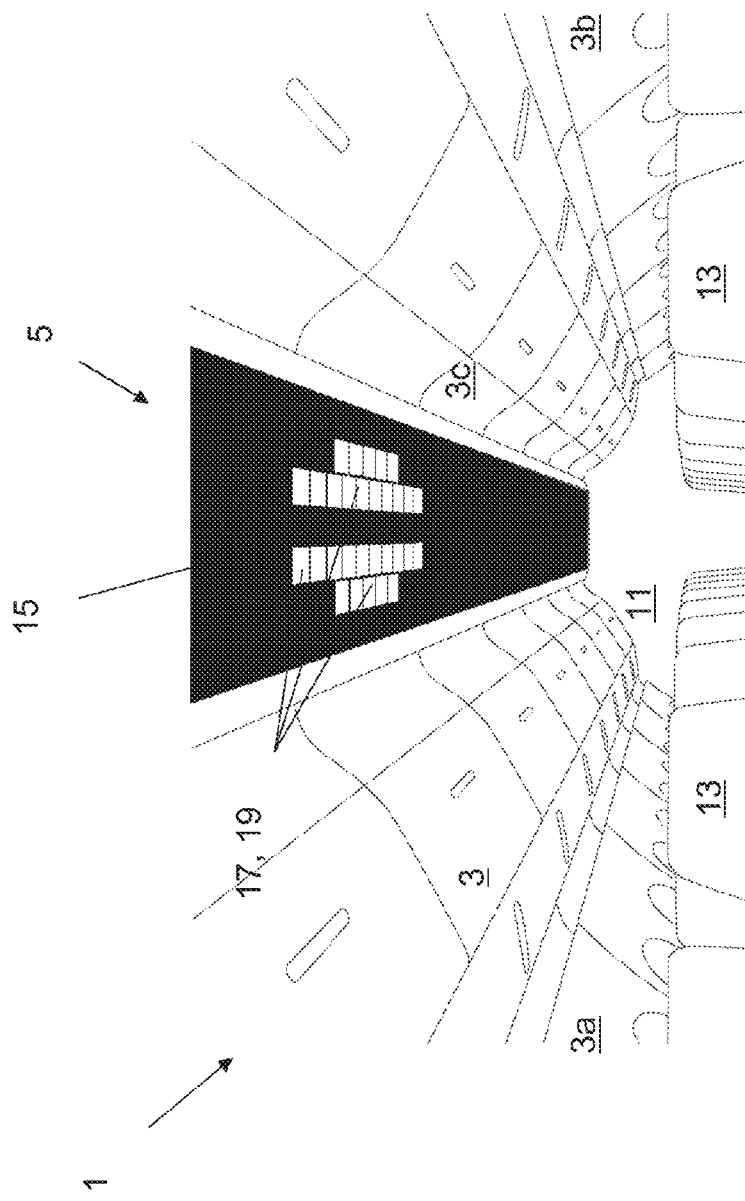
FIG. 2 shows the aircraft cabin arrangement shown in FIG. 1, wherein only selected element surfaces emit light.

In FIG. 1, the lighting elements 17 are controlled in such a way that all of the lighting elements 17 are switched on and all of the element surfaces 19 emit light of the same intensity and colour, with the result that the lighting device 5 is conventionally used exclusively for lighting the interior space 11 and not for reproducing information. In FIG. 2, on the other hand, individual lighting elements 17 are controlled on the basis of one of a plurality of control parameter sets stored in the storage device 21 in such a way that the element surface 19 of said lighting element emits light of an intensity and/or colour which deviates from the remaining element surfaces 19, with the result that, in this way, information can be reproduced, such as the position of a seat 13, for example. In the example shown, the remaining lighting elements 17 are completely switched off, for example. The specific light emission pattern shown in FIG. 2 can indicate, for example, a specific row of seats 13.

Figure 3:
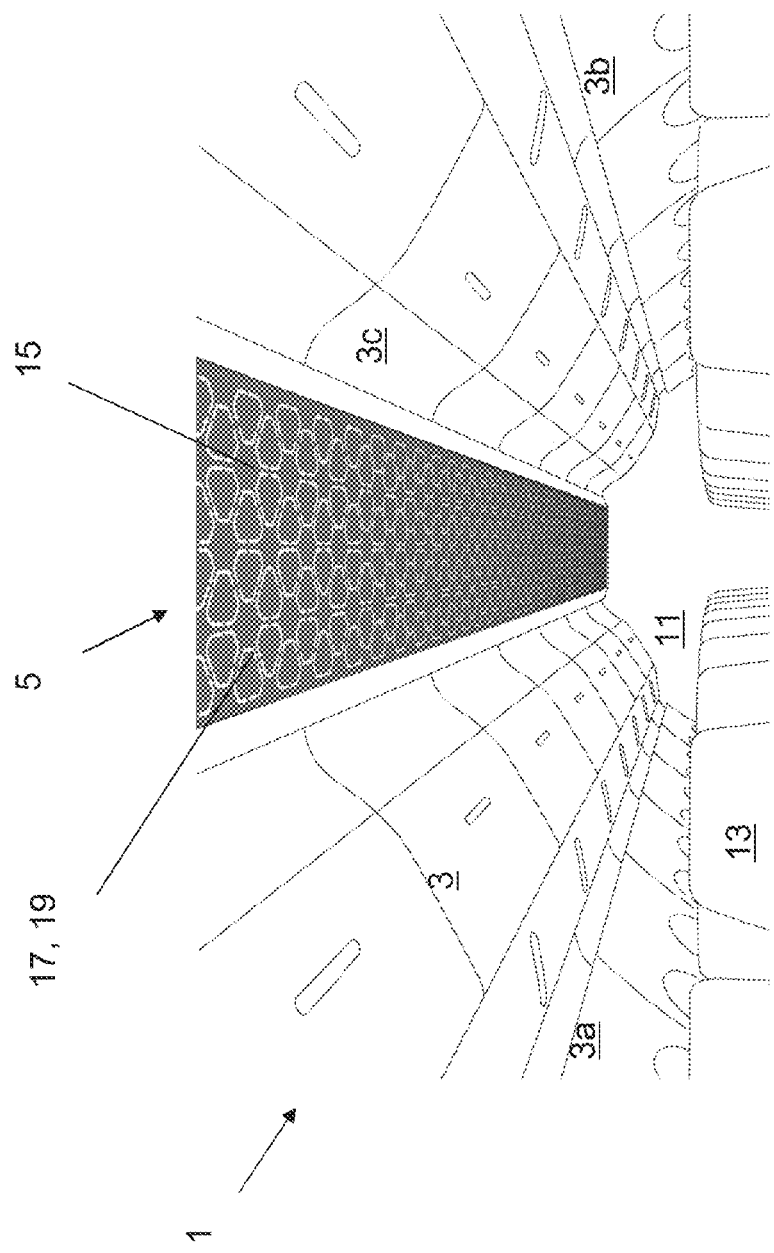
FIG. 3 shows a perspective illustration of an alternative aircraft cabin arrangement according to the subject matter disclosed herein comprising masked element surfaces.

FIG. 3 shows a modification of the embodiment shown in FIGS. 1 and 2, in which the rectangular element surfaces 19 are not completely exposed, but are covered with the aid of masking to the extent that only part of the element surface 19 having a specific shape is visible and actually emits light into the interior space 11. The shapes of the uncovered parts of the element surfaces 9 can advantageously be selected in a targeted manner such that the representation of desired information is facilitated.

As illustrated schematically in FIG. 4, in addition a sensor device 23 is provided which is connected to the control device 7 so as to enable signal communication and which is designed to receive a boarding pass signal 25 comprising the seat position of a passenger from an electronic boarding pass and to transmit a sensor signal 29 corresponding to the boarding pass signal 25 to the control device 7. The control device 7 is in turn designed to control the lighting elements 17 corresponding to the sensor signal 29 and, with the aid of their element surfaces 19, to emit a light emission pattern which reproduces information which makes it possible to draw a conclusion on the position of the row of seats 13 in which the seat of the passenger which is stored on the electronic boarding pass 27 is located or even on the seat itself.

FIG. 4 likewise illustrates an input button 31, which is provided in the region of the rows of seats 13 and, when activated, can trigger an input signal 33, which is supplied to the control device 7 and there effects the selection of a set of control parameters stored in the storage device 21 or the calculation and possibly subsequent storage of a set of control parameters by an algorithm, which in turn causes a specific variant of the light emission of the element surfaces 19. The variant of the light emission triggered by the input signal 33 in this case comprises a light emission of the lighting element 17 which is closest to the row of seats 13 assigned to the triggering button or of a group of lighting elements 17 which is close to this row of seats 13, which light emission deviates from the light emission of the remaining lighting elements 17 and in this way makes clear, for example, the call or the request for a flight attendant by a passenger sitting in a row of seats 13 made identifiable by the light emission.

The invention claimed is:

1. A vehicle cabin arrangement for assisting boarding of a vehicle body, comprising:
    a cabin wall which extends in tubular manner along a cabin longitudinal axis and surrounds an interior space, wherein the cabin wall has, when viewed transversely with respect to the cabin longitudinal axis, two opposite side sections, a ceiling section arranged between the two side sections and a floor section opposite the ceiling section;
    a lighting device, which is disposed centrally above a longitudinal aisle on the ceiling section and has a light-emitting surface directed towards the interior space, wherein the lighting device has a plurality of separate lighting elements, each of which has a dedicated light-emitting element surface directed towards the interior space and can assume different switch-on states or different light emission states which differ in terms of at least one property of the light emitted by the element surface of the respective lighting element;
    a control device for controlling the lighting device;
    the lighting elements being arranged distributed over the ceiling section where a plurality of element surfaces are arranged next to one another both in a direction parallel to the cabin longitudinal axis and in a direction perpendicular to the cabin longitudinal axis;
    the control device being adapted to control each lighting element individually such that, during operation, the lighting element can assume selectively each of the different switch-on states or different light emission states independently of the other lighting elements; and
    the control device having a storage device for storing a plurality of control parameter sets, each of which corresponds to a different light emission pattern of the plurality of lighting elements, the pattern comprising different switch-on states or light emission states of different lighting elements, and the control device being adapted to control the lighting device selectively for each of the control parameter sets where the lighting elements are operated in accordance with the corresponding light emission pattern;
    wherein a sensor device is provided in signal connection to the control device and configured to receive a boarding pass signal from an electronic boarding pass and to transmit a sensor signal corresponding to the boarding pass signal to the control device,
    wherein the boarding pass signal and the sensor signal comprise identification information which is configured to identify a seat of a holder of a boarding pass, and
    wherein the control device is configured to control the lighting elements corresponding to the sensor signal, such that one or more of the plurality of element surfaces, which is in a region of the seat of the holder of the boarding pass or is assigned to the seat of the holder of the boarding pass, is configured to reproduce information indicating the seat of the holder of the boarding pass by emitting corresponding light in the form of an arrow or in the form of a path which is configured to extend from an entry of the vehicle cabin arrangement up to the corresponding allocated seat.

2. The vehicle cabin arrangement according to claim 1, wherein, for each lighting element, different states of the light emission states differ from one another with respect to the intensity of the emitted light or with respect to the colour of the emitted light.

3. The vehicle cabin arrangement according to claim 1, wherein the control device is adapted such that, during operation:
  once a control parameter set corresponding to a light emission pattern which is constant over time has been stored in the storage device and once this control parameter set has been selected, the control parameter set controls the lighting device such that the lighting elements are operated using the light emission pattern which is constant over time; or
  once a control parameter set corresponding to a light emission pattern which is variable over time has been stored in the storage device and once this control parameter set has been selected, the control parameter set controls the lighting device such that the lighting elements are operated using the light emission pattern which is variable over time.

4. The vehicle cabin arrangement according to claim 1, wherein at least one lighting element comprises an OLED element which provides the element surface.

5. The vehicle cabin arrangement according to claim 1, wherein, in the direction parallel to the cabin longitudinal axis, at least 10 element surfaces are arranged next to one another and, in the direction perpendicular to the cabin longitudinal axis, at least 3 element surfaces are arranged next to one another.

6. The vehicle cabin arrangement according to claim 1, wherein a plurality of rows of seats is fitted on the floor section, which rows of seats each extend transversely to the cabin longitudinal axis and are spaced apart from one another along the cabin longitudinal axis, and wherein, when viewed in the direction of the cabin longitudinal axis, at least one lighting element is arranged on a level with each row of seats.

7. The vehicle cabin arrangement according to claim 1, wherein the element surfaces of a plurality of the lighting elements extend in a common plane.

8. The vehicle cabin arrangement according to claim 1, wherein a shield element is provided in front of the light-emitting surface of the lighting device, wherein the shield element has light-transmissive openings which are arranged in front of the light-emitting element surfaces of the lighting elements.

9. The vehicle cabin arrangement according to claim 1, wherein the electronic boarding pass is designed to transmit the boarding pass signal representing a seat position of the holder to the sensor device.

10. A vehicle comprising:
  a vehicle cabin arrangement for assisting boarding of a vehicle body, the vehicle cabin arrangement comprising:
    a cabin wall which extends in tubular manner along a cabin longitudinal axis and surrounds an interior space, wherein the cabin wall has, when viewed transversely with respect to the cabin longitudinal axis, two opposite side sections, a ceiling section arranged between the two side sections and a floor section opposite the ceiling section;
    a lighting device, which is provided on the ceiling section and has a light-emitting surface directed towards the interior space, wherein the lighting device has a plurality of separate lighting elements, each of which has a dedicated light-emitting element surface directed towards the interior space and can assume different switch-on states or different light emission states which differ in terms of at least one property of the light emitted by the element surface of the respective lighting element;
    a control device for controlling the lighting device;
    the lighting elements being arranged distributed over the ceiling section where a plurality of element surfaces are arranged next to one another both in a direction parallel to the cabin longitudinal axis and in a direction perpendicular to the cabin longitudinal axis;
    the control device being adapted to control each lighting element individually such that, during operation, the lighting element can assume selectively each of the different switch-on states or different light emission states independently of the other lighting elements; and
    the control device having a storage device for storing a plurality of control parameter sets, each of which corresponds to a different light emission pattern of the plurality of lighting elements, the pattern comprising different switch-on states or light emission states of different lighting elements, and the control device being adapted to control the lighting device selectively for each of the control parameter sets where the lighting elements are operated in accordance with the corresponding light emission pattern;
  wherein a sensor device is provided in signal connection to the control device and configured to receive a boarding pass signal from an electronic boarding pass and to transmit a sensor signal corresponding to the boarding pass signal to the control device,
  wherein the boarding pass signal and the sensor signal comprise identification information which is configured to identify a seat of a holder of a boarding pass, and
  wherein the control device is configured to control the lighting elements corresponding to the sensor signal, such that one or more of the plurality of element surfaces, which is in a region of the seat of the holder of the boarding pass or is assigned to the seat of the holder of the boarding pass, is configured to reproduce information indicating the seat of the holder of the boarding pass by emitting corresponding light in the form of an arrow or in the form of a path which is configured to extend from an entry of the vehicle cabin arrangement up to the corresponding allocated seat.

11. A method for assisting boarding of a vehicle cabin and for displaying information using a vehicle cabin lighting arrangement, the method comprising:
  providing a vehicle cabin arrangement for a vehicle body, the vehicle cabin arrangement comprising:
    a cabin wall which extends in tubular manner along a cabin longitudinal axis and surrounds an interior space, wherein the cabin wall has, when viewed transversely with respect to the cabin longitudinal axis, two opposite side sections, a ceiling section arranged between the two side sections and a floor section opposite the ceiling section;

a lighting device, which is provided on the ceiling section and has a light-emitting surface directed towards the interior space, wherein the lighting device has a plurality of separate lighting elements, each of which has a dedicated light-emitting element surface directed towards the interior space and can assume different switch-on states or different light emission states which differ in terms of at least one property of the light emitted by the element surface of the respective lighting element;

a control device for controlling the lighting device;

the lighting elements being arranged distributed over the ceiling section where a plurality of element surfaces are arranged next to one another both in a direction parallel to the cabin longitudinal axis and in a direction perpendicular to the cabin longitudinal axis;

the control device being adapted to control each lighting element individually such that, during operation, the lighting element can assume selectively each of the different switch-on states or different light emission states independently of the other lighting elements; and the control device having a storage device for storing a plurality of control parameter sets, each of which corresponds to a different light emission pattern of the plurality of lighting elements, the pattern comprising different switch-on states or light emission states of different lighting elements, and the control device being adapted to control the lighting device selectively for each of the control parameter sets where the lighting elements are operated in accordance with the corresponding light emission pattern;

inputting data corresponding to information to be displayed to the control device;

storing a control parameter set on the basis of the input data in the storage device, wherein the control parameter set represents a light emission pattern which corresponds to the information to be displayed; and controlling the lighting device by the control device on the basis of the control parameter set such that each lighting element is controlled individually with respect to the switch-on state or the light emission state, and the lighting device is operated corresponding to the light emission pattern;

wherein a sensor device is provided in signal connection to the control device and configured to receive a boarding pass signal from an electronic boarding pass and to transmit a sensor signal corresponding to the boarding pass signal to the control device, wherein the boarding pass signal and the sensor signal comprise identification information which is configured to identify a seat of a holder of a boarding pass, and wherein the control device is configured to control the lighting elements corresponding to the sensor signal, such that one or more of the plurality of element surfaces, which is in a region of the seat of the holder of the boarding pass or is assigned to the seat of the holder of the boarding pass, is configured to reproduce information indicating the seat of the holder of the boarding pass by emitting corresponding light in the form of an arrow or in the form of a path which is configured to extend from an entry of the vehicle cabin arrangement up to the corresponding allocated seat.

* * * * *